May 31, 1932.  W. B. PINE  1,860,475
PROCESS AND APPARATUS FOR TREATING ARGILLACEOUS MATERIAL
Filed July 22, 1930   2 Sheets-Sheet 1
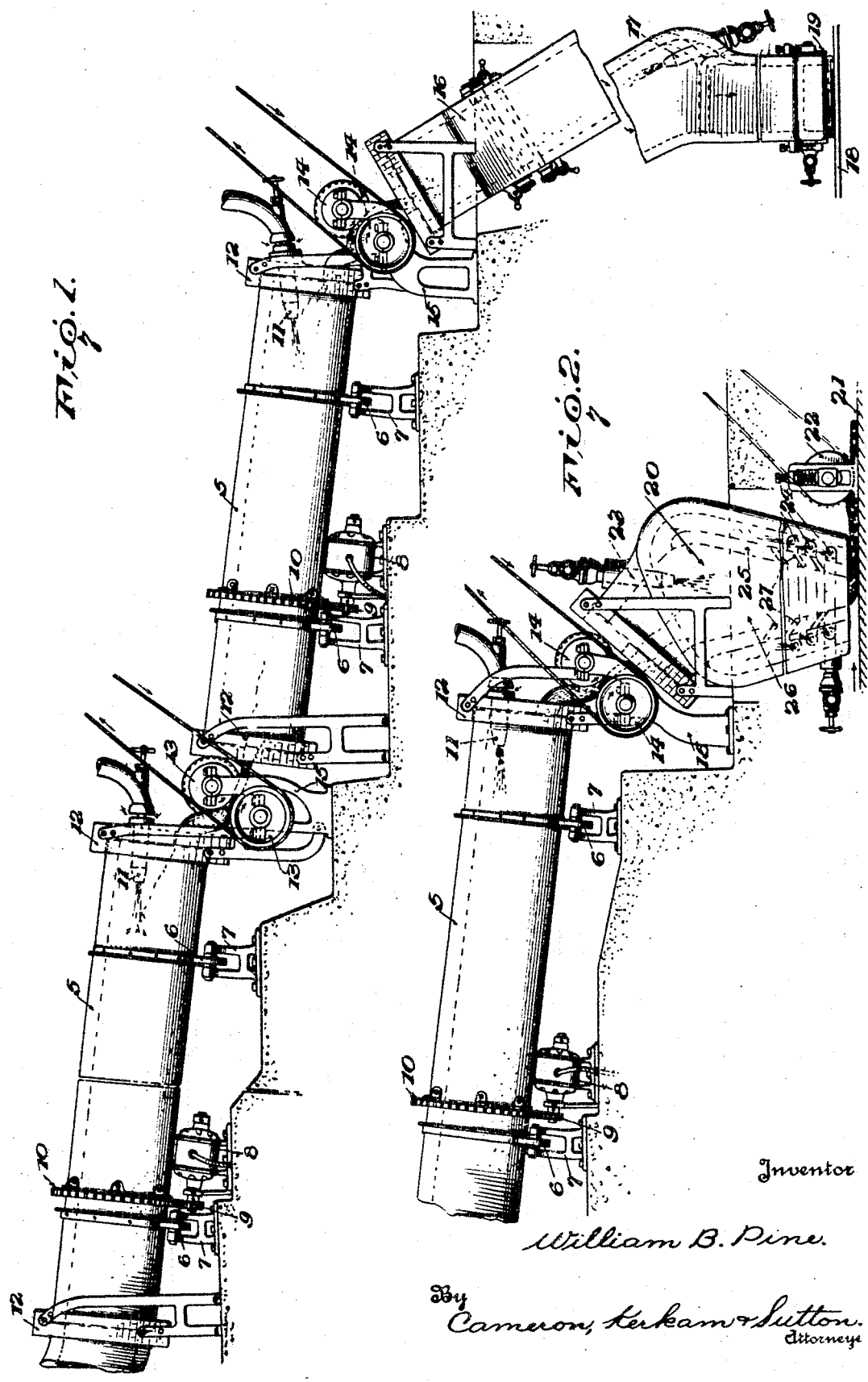
Inventor
William B. Pine
By Cameron, Kerkam & Sutton
Attorneys

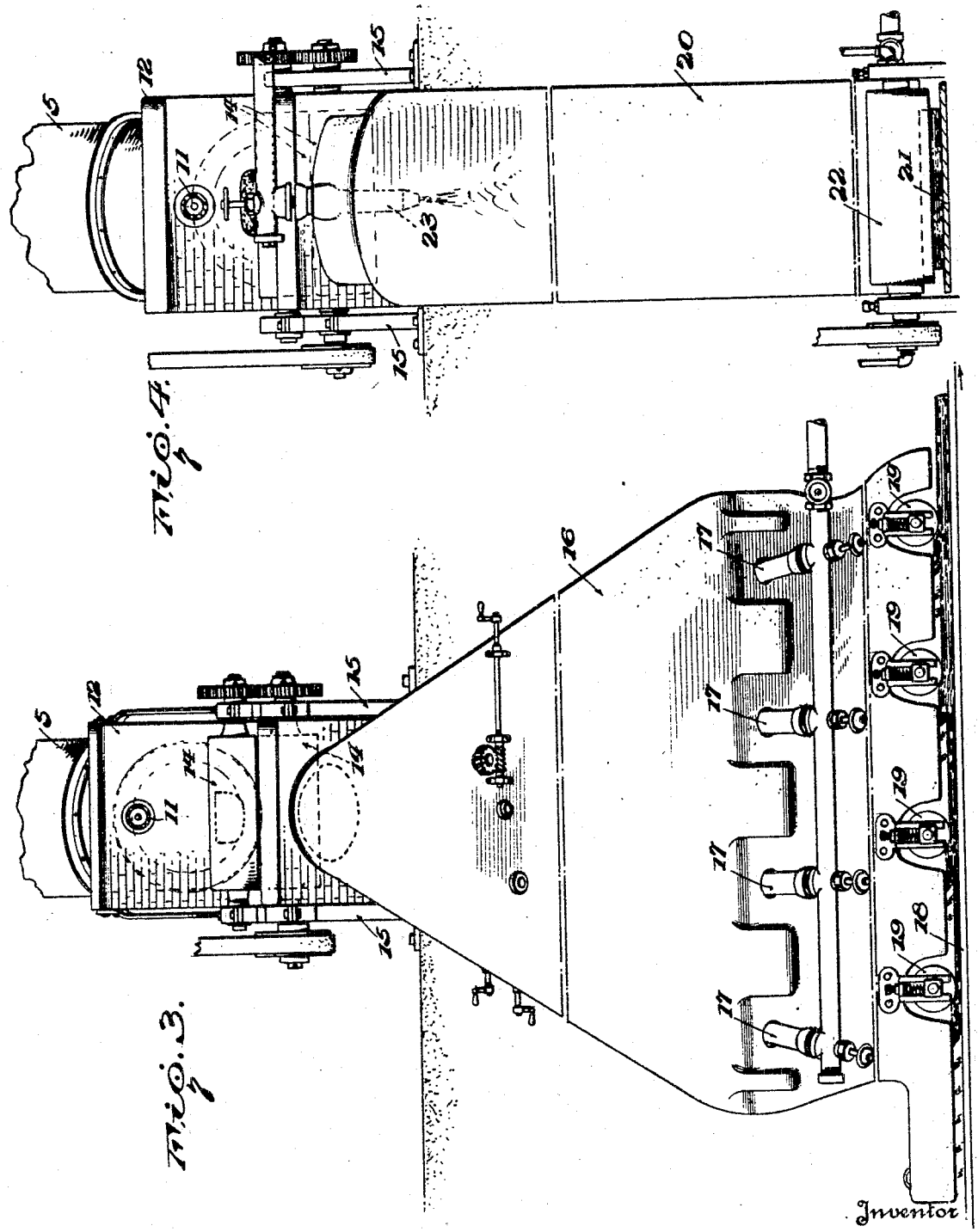

Patented May 31, 1932

1,860,475

UNITED STATES PATENT OFFICE

WILLIAM B. PINE, OF OKMULGEE, OKLAHOMA

PROCESS AND APPARATUS FOR TREATING ARGILLACEOUS MATERIAL

Application filed July 22, 1930. Serial No. 469,903.

This invention relates to a process of and apparatus for the treatment of argillaceous materials, particularly clays and shales, in the manufacture of vitrified products from such materials.

It has been discovered that argillaceous materials, such as clay, shale and the like, when heated to a temperature at which said materials are plastic or semi-plastic but not completely fused, may be compacted and densified by the application of pressure while so heated and molded to form products having uniform composition and texture and being tough, dense, hard and rock-like. The starting materials suitable for use in this manner include broadly argillaceous materials such as clay or shale of many varieties, either alone or mixed with suitable ingredients to aid or increase properties in which the clay or shale may be deficient. Materials of this kind are first heated to a temperature at which they become plastic or semi-plastic but at which they are not completely fused and while hot are molded to the desired shape, preferably under pressure applied, for example, by suitable rollers, dies or the like. The application of molding pressure compacts the hot material, decreasing the porosity of the resultant product and increasing its hardness and density.

The materials may be heated in the raw or natural state as taken from the ground, or they may be crushed, ground or pulverized to any desired degree of fineness. When these materials are heated, a somewhat loose mass of plastic or semi-plastic material is obtained which is full of voids which may vary from more or less minute spaces between the particles to relatively large air pockets. When the mass is dehydrated or oxidized quickly, more voids are produced. In order to produce a product which is non-porous, tough, hard, dense and compact, the hot material must be compacted and the voids therein eliminated before or during the molding operation while the materials are maintained in a hot plastic or semi-plastic state. While this may be effected to a certain extent by molding the materials under substantial pressure, it is often not desirable to employ considerable pressure for molding purposes, or the size and shape of the article to be produced may be such that uniform density and hardness cannot be produced throughout the mass by the molding operation.

A mass of materials of the character above specified is composed of many different elements, each of which has its own melting point, and when such a mass is heated until it becomes plastic or semi-plastic, some of these elements become liquid or partially liquid while others remain in a substantially solid state. For the purposes of the present invention, it is important that as little heat as possible be employed in order that as few as possible of the elements of the mass melt or liquefy, because articles such as brick made from material that has been completely fused are brittle and quickly disintegrate. While the reason for this is not thoroughly understood, it is an unquestionable fact and is probably due to the fact that the separate elements of the mass have a sort of molecular affinity or for other reasons a tendency to assemble together and separate from the other elements so that the resultant mass is composed of many segregated small masses of more or less pure elements. These small masses have different rates of expansion and contraction, different absorption, etc., so that the product tends to decompose by weathering and, moreover, strains and stresses may be set up in the mass during cooling because it is not uniform throughout in composition. It is therefore desirable that as little heat be employed and as few of the elements of the mass fused as possible and further that the fused or partially fused and the more solid elements be completely and thoroughly mixed and brought into close and intimate contact with one another.

One of the objects of the present invention is to provide a process of and apparatus for treating materials of the character specified above whereby said materials while heated to a plastic or semi-plastic state are mechanically kneaded, rolled or otherwise manipulated prior to the molding operation to work the pores or voids, air pockets and the like out of the mass.

A further object is to provide a process and apparatus whereby materials of the character specified above are subjected to successive heating and mechanical working a number of times before the molding operation the mass being kept in a hot plastic or semi-plastic state while being worked and until finally molded to the desired shape.

A further object is to provide a process and apparatus whereby materials of the character specified are subjected to mechanical working or manipulating to mix the materials thoroughly and to prevent segregation or separation of the individual constituents of the mass.

A still further object is to provide a process and apparatus for mechanically working or kneading, etc., a plastic or semi-plastic mass of argillaceous materials whereby the fused and unfused elements of the mass are thoroughly mixed and brought into close intimate contact.

Other objects are to provide a novel process and apparatus to reduce the amount of heat required in the preparation of the materials for molding, to reduce to a minimum the proportion of fused or semi-fused elements in the mass, and to distribute the fused or semi-fused bonding elements thoroughly and uniformly throughout the mass to improve the bond.

With the above objects in view, the invention, generally stated, includes a process whereby the materials to be treated are subjected to successive heating and mechanical working before being finally molded to the desired shape, and an apparatus for carrying out said process which comprises broadly one or more heating means of any suitable type through which the materials are passed, means being associated with said heating means for mixing, kneading, rolling or otherwise manipulating the materials during their passage through said heating means to reduce or eliminate the voids therein while the temperature of said materials is maintained at the desired point.

One form of apparatus embodying the invention is illustrated in the accompanying drawings, and one embodiment of the process is described hereinafter in connection therewith, but it is to be expressly understood that said drawings are for purposes of illustration only and are not to be construed as a definition of the limits of the invention, reference being had to the appended claims for this purpose.

In said drawings,

Fig. 1 shows in diagrammatic form an elevation of apparatus embodying the invention;

Fig. 2 shows a form of means for feeding the hot materials to molding position; and Figs. 3 and 4 are respectively end views of Figs. 1 and 2.

While any suitable heating means may be employed for heating the materials to a hot plastic or semi-plastic but not fused state, rotary furnaces or kilns are preferably used for this purpose. As shown in the drawings, two rotary kilns 5 are arranged so that the materials to be treated pass successively through the kilns, but it will be understood that any suitable number and arrangement of kilns may be used. The rotary kilns 5 as shown are rotatably mounted by suitable means such as rollers 6 carried by supports 7, said kilns preferably being suitably inclined to the horizontal so that materials fed to the rotating kilns at one end will travel downwardly toward the other ends thereof. The kilns 5 may be rotated in any suitable manner, as by means of electric motors 8 having pinions 9 meshing with teeth 10 secured in any suitable manner to said kilns 5. The kilns may furthermore be heated in any suitable manner, as by means of burners 11 of any suitable type which may employ as fuel powdered coal, gas, etc. Preferably the ends of the kilns are closed by suitable doors or boxes 12, these being provided with suitable openings for the passage of the materials to be treated, for the introduction of burners 11 into the kilns, etc. The specific construction of the apparatus above described constitutes no part per se of the present invention.

The materials to be treated may be fed to the first rotary kiln in any suitable manner and are caused to travel through said kiln due to the rotation and inclination thereof in the usual manner. From the first rotary kiln, the materials are fed as hereinafter described into the second kiln from which they are discharged and conveyed in any suitable manner to molding position, said materials during their passage through said kilns being brought to and maintained at a temperature at which they are plastic or semi-plastic but not completely fused by means of burners 11.

The materials, if heated in the above manner without mechanical working, contain voids of varying sizes from more or less minute voids or spaces between the particles of the materials to air and gas pockets and holes of considerable size and unless these voids are removed, the resultant product tends to have a porous or cellular structure instead of the desired dense, hard, tough, wear resistant structure. Accordingly, the materials are suitably worked or kneaded by mechanical means during their passage through the heating system, said means comprising any suitable mechanical devices which compact and densify the materials of the mass and work out the voids, and thoroughly mix the separate elements of the mass. Preferably this working or kneading of the material is accomplished by passing it between rollers, and in the form shown, two sets of rollers are employed, one comprising a pair of rolls 13 positioned between the adjacent ends of kilns 5 and the other comprising a pair of rolls 14 positioned at the discharge end of the second kiln 5, said rolls being preferably mounted in bearings carried by suitable brackets 15. These rolls are preferably open to the air, and any suitable auxiliary cooling means may be employed.

The materials in the first kiln, heated to a plastic or semi-plastic but not fused state by burner 11, pass between rolls 13 and issue therefrom in the form of a thin sheet into the second kiln wherein any heat lost during the rolling operation is restored, and because of the plasticity of the hot materials this sheet is readily broken up in passing into and through the second kiln. One result of passing the materials through rolls 13 is to mix, compact and densify the materials and to reduce the voids in the mass, making it less porous. Another result of this rolling is to distribute the melted or semi-melted bonding material uniformly throughout the mass and to bring into close contact the fused and unfused elements, thereby securing a better bond. The mechanical working thus promotes, facilitates and hastens the desired physical and chemical changes in the material. In the second kiln, the heat supplied by burner 11 maintains the materials in a plastic state, and on leaving the second kiln 5, the materials pass through the second pair of rolls 14, the action of which supplements the action of rolls 13 and further works and manipulates the mass to mix, compact and densify the materials and reduce the voids. It will be understood that any suitable number of heating units and any suitable number of kneading or working devices, may be employed.

From the rolls 14, the materials are passed or conducted in any suitable manner, preferably directly to molding position. In the form shown in Figs. 1 and 3, the materials are discharged from rolls 14 into an inclined fan-shaped distributing pan 16 through which they descend by gravity. During their passage through the pan, the materials are kept hot by suitable means such as one or more burners 17, and at the bottom of the pan, the materials are discharged downwardly preferably at a plurality of points onto a travelling surface 18 which may comprise a suitable belt, molds, cars or the like. As shown, the materials are rolled out flat on surface 18 by means of suitable rollers 19 to form sheets, although it will be understood that any other suitable form of molding apparatus may be employed.

Figs. 2 and 4 show another form of feeding apparatus into which the materials may be discharged by rolls 14, which apparatus may be substituted for the distributing pan 16 of Figs. 1 and 3. In Figs. 2 and 4, a vertical funnel shaped feeder 20 is employed, the materials passing out of the bottom of the feeder onto a travelling surface 21, on which they are rolled out flat by means of a roller 22. In this form of feeder, the materials are preferably kept hot by means of a burner 23 and burners 24 which heat the outer sides of walls 25 forming a passage 26 through which the hot materials descend. Preferably passage 26 is of sufficient vertical extent that the materials pack toward its bottom due to their own weight, thus further eliminating voids in the mass, and openings 27 may be provided in walls 25 to provide for the escape of air and gases from said passage. The particular forms of feeders 16 and 20, however, constitute no part per se of the present invention, wherein any suitable feeding means may be employed, but are claimed in copending applications Serial Nos. 469,904 and 469,905, filed of even date herewith.

The above described process and apparatus provide for heating the desired argillaceous materials to a temperature at which they are plastic or semi-plastic but not completely fused, repeatedly kneading, rolling or otherwise mechanically working the materials while so heated to mix, compact and densify the same and to eliminate voids therein, and passing the material after the mechanical working and while so heated directly to the molding operation to produce the desired final product.

The plastic or semi-plastic mass of materials contains many separate elements, some of which are fused or partially fused while others remain in a more solid state, the fused or semi-fused elements constituting the bonding material. By mechanically working, kneading or manipulating the heated materials, these fused or semi-fused elements are thoroughly mixed and brought into close intimate contact with the more solid elements, and particularly by rolling the mass into thin sections the fused or semi-fused elements are distributed throughout the mass and the result is a thoroughly mixed uniform material which produces a tough, hard and dense product. With the use of mechanical working, less elements need be fused or partially fused and accordingly the temperature required may be reduced with a saving in fuel and in depreciation of equipment while at the same time the working or mixing produces a better product. The tendency of the elements of the mass to separate and assemble together to form small masses of more or less pure elements, or to segregate, is prevented by the thorough mixing of the materials, so that the resulting mass is uniform in composition and texture, cools evenly without setting up stresses or strains, and constitutes a substantially homogeneous mass. Rolling the mass tends to elongate and reduce the voids, and the repeated breaking up and rolling of the materials results in substantially complete elimination of voids. The result is a product having uniform texture and physical characteristics and being non-porous and tough, dense, hard and rock-like in character. Products of this kind are suitable for use as paving blocks, building blocks, heavy structural elements which can be used in place of wood and stone, steel, concrete and the like, and are available for use in other arts employing molded articles.

While only single embodiments of the process and of the apparatus have been described and illustrated in the drawings, it is to be expressly understsood that the invention is not limited thereto. Thus the number and character of mechanical workings of the material may be varied to suit conditions, other forms of heating units, working devices, etc., can be employed, and various changes can be made in the details and arrangement of the various elements without departing from the spirit of the invention. Reference is therefore to be had to the appended claims for a definition of the limits of the invention.

What is claimed is:

1. A process for treating a mass of materials containing clay or shale which consists in heating said mass to a temperature at which the mass becomes somewhat plastic but not fused, compacting and densifying the mass to reduce voids by subjecting it while so heated to mechanical working, and then molding the mass under pressure.

2. A process for treating a mass of materials containing clay or shale which consists in heating said mass to a temperature at which the mass becomes somewhat plastic but not fused, maintaining said temperature of the mass while densifying and intimately mixing the materials by subjecting them to repeated mechanical working, and then molding the hot mass.

3. A process for treating argillaceous materials which consists in heating a mass of said materials to a temperature at which the mass becomes somewhat plastic but not fused, maintaining said temperature and subjecting the mass to successive heating and mechanical working operations, and molding the mass while so heated.

4. A process for treating argillaceous materials which consists in heating a mass of such materials to a temperature at which the mass becomes somewhat plastic but not fused, mechanically working the hot mass to densify and mix the materials, reheating the mass to restore heat lost during the working operation, and molding the hot mass under pressure.

5. A process for treating argillaceous materials which consists in heating a mass of such materials to a temperature at which the mass becomes somewhat plastic but not fused, rolling the hot mass under pressure to densify and compact the materials, reheating the mass to restore heat lost during rolling, and molding the hot mass.

6. A process for treating argillaceous materials which consists in heating a mass of such materials to a temperature at which the mass becomes somewhat plastic but not fused, densifying and compacting the materials by rolling the hot mass under pressure while maintaining said temperature of the mass, and then molding the hot mass.

7. A process for treating argillaceous materials which consists in heating a mass of such materials to a temperature at which the mass becomes somewhat plastic but not fused, densifying and compacting the materials by subjecting the hot mass to repeated rolling under pressure, maintaining said temperature of the mass by reheating the same to restore heat lost during the rolling operations, and molding the hot mass.

8. Apparatus for treating argillaceous material comprising a plurality of heating means serially arranged so that said material passes therethrough, a plurality of means for mechanically working said material while so heated, and means for molding said material.

9. Apparatus for treating argillaceous material comprising a plurality of heating means serially arranged so that said material passes therethrough, means interposed between adjacent heating means for mechanically working said material, and means for molding the heated and worked material.

10. Apparatus for treating argillaceous material comprising means for heating said material, means for rolling said material to compact and densify the same, and means for molding the heated and rolled material.

11. Apparatus for treating argillaceous material comprising means for heating said material, a plurality of means for rolling said material to compact and densify the same, means for maintaining the temperature of the material during rolling, and means for molding the heated and rolled material.

12. Apparatus for treating argillaceous material comprising a plurality of means for heating said material and arranged so that said material passes therethrough, and a plurality of rollers for working said heated material to reduce the voids therein.

13. Apparatus for treating argillaceous material comprising a plurality of means for heating said material and arranged so that said material passes therethrough, and a plurality of pairs of rollers interposed between successive heating means for rolling and feeding the material.

14. Apparatus for treating argillaceous material comprising a rotary kiln for heating said material, rollers adjacent the outlet of said kiln for rolling and working said material, means for feeding said material to molding position, and means for molding said material.

15. Apparatus for treating argillaceous materials comprising a plurality of rotary kilns arranged end to end for successively working said materials, and means including rollers adjacent the outlets of said kilns for mechanically working said materials.

16. Apparatus for treating argillaceous materials comprising a plurality of rotary kilns arranged end to end for successively working said materials, means adjacent the outlets of said kilns for rolling said materials, means for feeding said materials to molding position, and means for molding said materials.

17. A process for treating a mass of argillaceous materials which comprises heating a mass of such materials to a temperature at which sufficient of the elements of said mass are fused or partially fused to form a somewhat plastic mass, mechanically working the hot plastic mass while maintaining said elements in a fused or partially fused condition to mix and bond the elements thoroughly and to prevent segregation of separate elements, and molding the hot worked mass.

18. A process for treating a mass of argillaceous materials which comprises heating said mass to a temperature at which it becomes somewhat plastic but not substantially fused, rolling the hot materials in thin sections to mix the separate elements thoroughly and prevent segregation of individual elements, and molding the hot materials.

In testimony whereof I have signed this specification.

WILLIAM B. PINE.